US005987802A

United States Patent [19]

Caprio

[11] Patent Number: 5,987,802

[45] Date of Patent: Nov. 23, 1999

[54] FISHING LURE ILLUMINATOR

[76] Inventor: Susan M. Caprio, 4021 NE. 27th Ter., Lighthouse Point, Fla. 33064

[21] Appl. No.: 09/185,135

[22] Filed: Nov. 3, 1998

[51] Int. Cl.[6] .................................................. A01K 85/01

[52] U.S. Cl. ......................... 43/17.5; 43/17.6; 43/43.12; 43/43.15; 43/44.83; 43/17.5

[58] Field of Search .................................. 43/17.5, 17.6, 43/44.83, 42.04, 43.1, 44.84, 44.85, 43.15, 43.12, 4.5

[56] References Cited

U.S. PATENT DOCUMENTS

| | | | |
|---|---|---|---|
| 2,768,468 | 10/1956 | Kibler . | |
| 3,218,751 | 11/1965 | Walker . | |
| 3,824,731 | 7/1974 | Sandschaper | 43/17.5 |
| 4,617,751 | 10/1986 | Johansson | 43/17.5 |
| 4,621,447 | 11/1986 | Rhodes | 43/17.5 |
| 4,672,765 | 6/1987 | Lutz | 43/17.5 |
| 5,063,700 | 11/1991 | Kiefer | 43/17.6 |
| 5,122,306 | 6/1992 | Van Moer | 252/700 |
| 5,175,950 | 1/1993 | Linder | 43/17.1 |
| 5,175,951 | 1/1993 | Fruchey | 43/17.6 |
| 5,195,266 | 3/1993 | Troescher | 43/17.6 |
| 5,299,107 | 3/1994 | Ratcliffe et al. | 43/17.6 |
| 5,758,450 | 6/1998 | Young | 43/17.6 |

OTHER PUBLICATIONS

Product Card "Arc Minnow" By Yo–Zuri, Tachibana Takeo, Saga 843 Japan.

*Primary Examiner*—Jack W. Lavinder
*Attorney, Agent, or Firm*—Alvin S. Blum

[57] ABSTRACT

A method of illuminating a fishing lure employs an illuminator that connects to a fishing line at a leading end and a fishing lure or bait at a trailing end. The illuminator has a light emitting diode (LED) or laser contained within a body having a battery. The light emitter emits a light beam out past the trailing end that illuminates the lure when tension is applied to the leading end such as by trolling, retrieving or drifting. The light beam subtends a narrow solid angle so that the battery energy is only used to illuminate the lure.

11 Claims, 1 Drawing Sheet

16 2 10 3 14 13 9 1 5 15

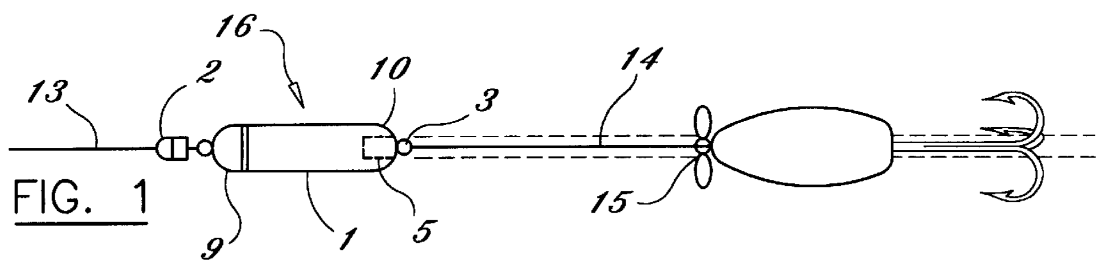
FIG. 1
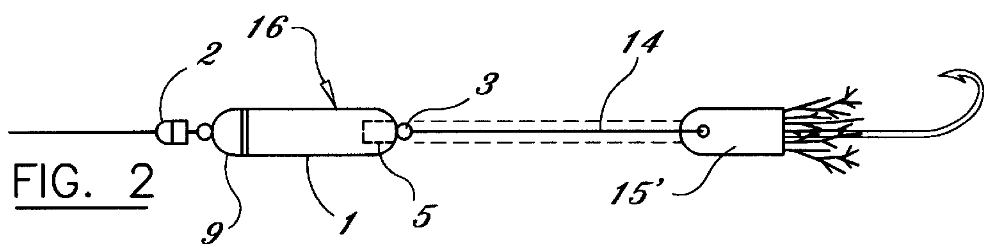
FIG. 2
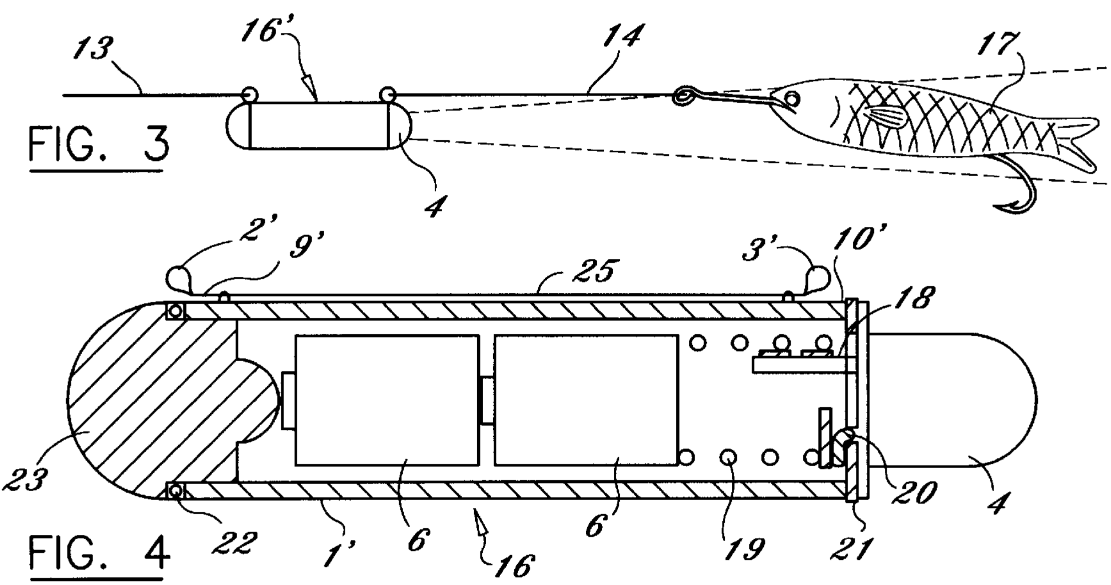
FIG. 3
FIG. 4
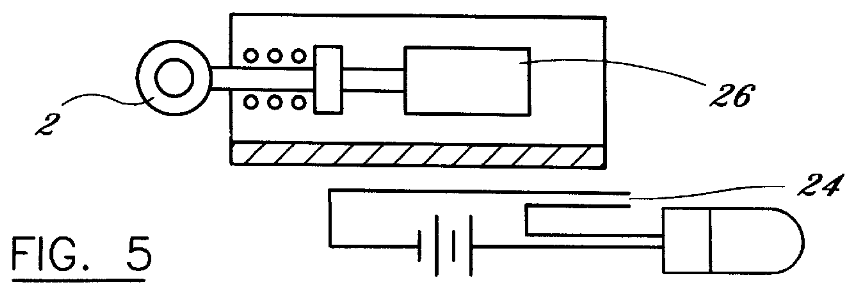
FIG. 5

FISHING LURE ILLUMINATOR

BACKGROUND OF THE INVENTION

This invention relates to fishing and more particularly to methods and apparatus for illuminating fishing lures to make them more attractive to fish.

It is well known that fish often use visual information to find their edible prey. Certain fishing lures employ visual effects to enhance their attractiveness to fish. These include reflective metal spinners, various colors, and hair, and streamers with various shapes and textures. When drift fishing for swordfish at night, a large dead squid fished about 100 feet down is a preferred bait. Attaching a chemically activated light stick, such as described in U.S. Pat. No. 5,122,306 issued Jun. 16, 1992 to Van Moer, positioned above the ten foot leader greatly increases the probability of attracting a fish, even though the squid itself is not illuminated.

U.S. Pat. No. 5,175,951 issued Jan. 5, 1998 to Fruchey discloses a fish lure with a hollow body having a light emitting diode within the body for attracting fish to the lure. U.S. Pat. No. 5,758,450 issued Jun. 2, 1998 to Young discloses a fish lure with a laser within the body of the lure for illuminating a part of the lure to attract fish.

Providing a battery operated light source within the lure as disclosed by Fruchey and Young greatly increases the cost of the lure. Lures are frequently lost during fishing by hooking onto obstructions or breaking off or cutting off by fish. Users are reluctant to pay for expensive lures that are so easily lost. When fishing, it is common to change lures frequently until a lure is found that attracts strikes under the current fishing conditions. Users are reluctant to pay for a plurality of different lures if they are all made more expensive by their light emitting properties. It may be more desirable to illuminate more of the lure than can be achieved when the light source is within the lure.

SUMMARY OF THE INVENTION

It is accordingly an object of the invention to provide a method and apparatus to illuminate fishing lures that will not result in loss of the illumination apparatus when a lure is lost by being snagged on an obstruction or broken off by a fish, for example. It is another object of the invention to provide a method and apparatus to illuminate a variety of lures that permits the lure to be changed without having to change the illumination means. It is yet another object that the emitted light be directed to the lure to enhance the chances of the fish striking the lure so that the battery energy is not wasted and so that the fish is less likely to strike the illuminator. The term lure as applied herein is meant to include natural baits, both dead and live as well as artificial lures of all types.

The apparatus of the invention comprises:

A) a body containing: a battery; at least one light emitter such as a light emitting diode (LED) or a laser; and means for connecting the battery to the light emitter or emitters;

B) means at a first end of the body for attaching the body to a fishing line;

C) means at a second end of the body for attaching the body to a fishing lure; and D) the body being so constructed that the emitted light is directed onto the lure when the fishing line exerts a force on the first end of the body.

These and other features, advantages and objects of the invention will become more apparent when the detailed description is studied in conjunction with the drawings.

BRIEF DESCRIPTION OF THE DRAWINGS

FIG. 1 is a side elevation view of an illuminator of the invention in use with a spinner lure.

FIG. 2 is a side elevation of the illuminator of the invention in use with a feather jig.

FIG. 3 is a side elevation view of another embodiment of the invention in use with a rigged ballyhoo bait.

FIG. 4 is a sectional view of an illuminator of the invention with a water actuated battery connection.

FIG. 5 is a diagrammatic representation of a magnetic switch battery connection.

DETAILED DESCRIPTION OF THE PREFERRED EMBODIMENTS

Referring now first to FIGS. 1 and 2, an illuminator 16 is fastened to a fishing line 13 by a line attaching means 2 which may include a snap swivel at a leading end 9 of illuminator body 1. A lure attaching means 3 at a trailing end 10 of body 1 is attached to a leader 14 attached to a spinner lure 15 or a feather jig 15. A battery powered laser 5 within body 1 emits a narrow beam of light past the trailing end 10 and directed onto the lure when the leading end 9 is pulled through the water by the fishing line 13. Trolling the lure from a moving boat or retrieving the cast lure will cause the lure to follow the illuminator and be illuminated by the light emitted from the trailing end. Even drifting a live or dead bait will usually cause the lure to be positioned so that it will be illuminated at least some of the time. A wobbling or swimming bait may be periodically illuminated by moving in and out of the light path. This may have a more attractive effect than a steady illumination. An advantage of the laser light source is that it is minimally divergent, so that the lure may be positioned a considerable distance from the illuminator without appreciable light loss. The lure line or leader 14 may be arranged to have at least a portion with a breaking strength less than that of the fishing line 13 so that there is less chance of losing the illuminator when the lure is lost by breaking off by a fish or catching on an obstruction. The lure attaching means 3 may include a snap swivel so that the lure and leader are easily changed.

Referring now to FIG. 3, another embodiment of the illuminator 16' employs a light emitting diode (LED) 4 with a divergent light beam of 20°. The lure in this case is a rigged dead fish 17. Details of the structure of the illuminator 16' are shown in FIG. 4. A tubular body 1' has a hermetically sealed LED 4 at a trailing end 10'. A first lead 18 from the diode is soldered to spring 19 which contacts the cathode of battery 6. A second lead 20 is soldered to a brass washer 21 interposed and sealed between the diode and the tubular body 1'. At the leading end the body is threaded to receive a brass screw 23 which contacts a battery anode and seals the tube with O ring 22. The tubular body is non conductive so that the circuit is not completed until conduction between the brass washer 21 and the brass screw is made by a conductive medium such as water with electrolytes such as sea water.

A stainless steel wire 25 has a line attaching means 2' at one end and a lure attaching means 3' at a second end. The wire is fastened along the outside of the body 1'. Other means, well know in the art, may be employed for connecting the battery to the emitter, some of which are only activated when tension is applied to the line attaching means. This is exemplified by the magnetic switch mechanism shown in FIG. 5. A magnetic reed switch 24 sealed within the body is turned on when a magnet 26 is pulled past it. The magnet is mounted outside the body, it is spring loaded and connected to the line attaching means 2 so that the switch 24 is only actuated when the fishing line is pulling the illuminator.

The light emitter, whether LED or laser, emits light in a narrow beam that illuminates the lure without wasting battery energy on illuminating just water. A further advantage of a narrow light beam is that the light is less likely to attract fish to the illuminator. A narrow beam that subtends a solid angle of less than forty degrees is preferable.

The above disclosed invention has a number of particular features which should preferably be employed in combination although each is useful separately without departure from the scope of the invention. While I have shown and described the preferred embodiments of my invention, it will be understood that the invention may be embodied otherwise than as heroin specifically illustrated or described, and that certain changes in the form and arrangement of parts and the specific manner of practicing the invention may be made within the underlying idea or principles of the invention.

What is claimed is:

1. A fishing lure illuminator for attaching to a fishing line and for illuminating a fishing lure spaced away from the illuminator, the illuminator comprising:

a) a body having a leading end, and a trailing end;

b) a battery contained within the body;

c) at least one light emitter contained within the body, the light emitter, when energized by the battery, disposed to emit light in a narrow beam that projects out past the trailing end;

d) means for electrically connecting the battery to the at least one light emitter;

e) leader means for connecting the body to the lure in a spaced apart relationship, the leader means having a breaking strength less than that of the fishing line;

f) means for attaching the body to the leader means that is attached in turn to the fishing lure so that the body is spaced away from the lure to prevent loss of the illuminator if the lure is lost; and g) the body being so constructed that light emitted from the at least one light emitter is directed past the trailing end and onto the spaced apart lure when a pulling force is exerted by the fishing line attached to the leading end so as to move the lure into the narrow beam.

2. The illuminator according to claim 1, in which the at least one light emitter is selected from the group consisting of light emitting diodes and lasers.

3. The illuminator according to claim 2, in which the means for attaching the body to a fishing lure is located at the trailing end.

4. The illuminator according to claim 2, in which the means for attaching the body to a fishing lure is located near the trailing end.

5. The illuminator according to claim 2, in which the means for connecting the battery to the at least one light emitter is actuated by a pulling force on the leading end.

6. The illuminator according to claim 2, in which the means for connecting the battery to the at least one light emitter is actuated by immersion in water.

7. The illuminator according to claim 1, in which that at least one light emitter is a light emitting diode.

8. The illuminator according to claim 1, in which the at least one light emitter is a laser.

9. The illuminator according to claim 1, in which said narrow beam subtends a solid angle of less than about twenty degrees.

10. A method of illuminating a fishing lure comprising the steps of:

a) providing an illuminator having a body with a leading end connector, a trailing end connector, and a battery operated light emitter within the body that emits light in a narrow beam out through the trailing end;

b) attaching the leading end connector to a fishing line;

c) providing a leader with a first and second end that has a lure attached to the first end;

d) connecting the second end of the leader to the trailing end connector; and e) applying tension to the fishing line so that light emitted by the light emitter passes out through the end of the body away from the fishing line in a narrow beam that is projected onto the lure trailing behind the illuminator.

11. The method according to claim 10, in which the narrow beam subtends a solid angle of less than about twenty degrees.

* * * * *